J. PATTEN.
PURIFICATION OF WATER.
APPLICATION FILED AUG. 19, 1908.
1,039,586.
Patented Sept. 24, 1912.
2 SHEETS—SHEET 2.
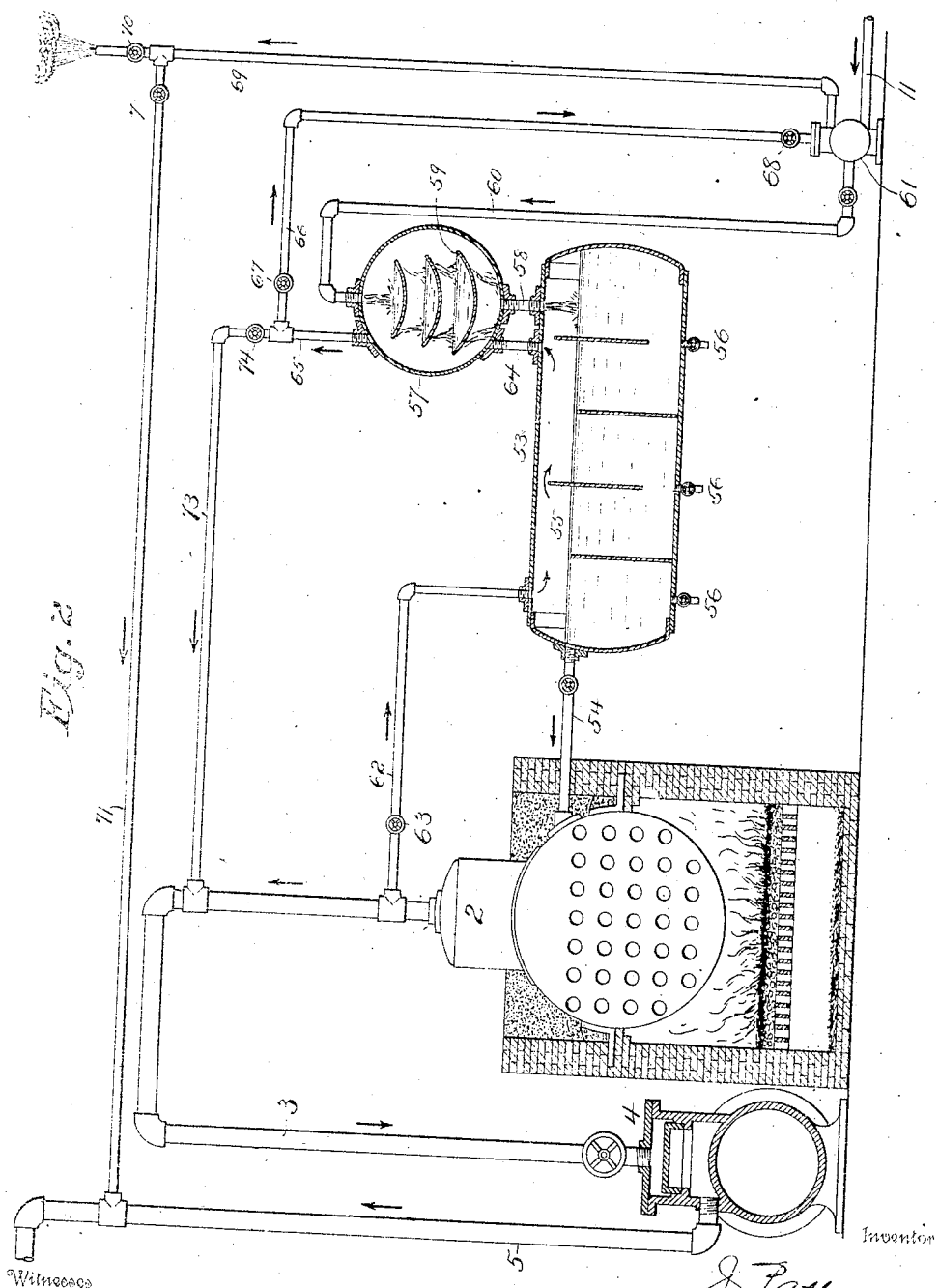

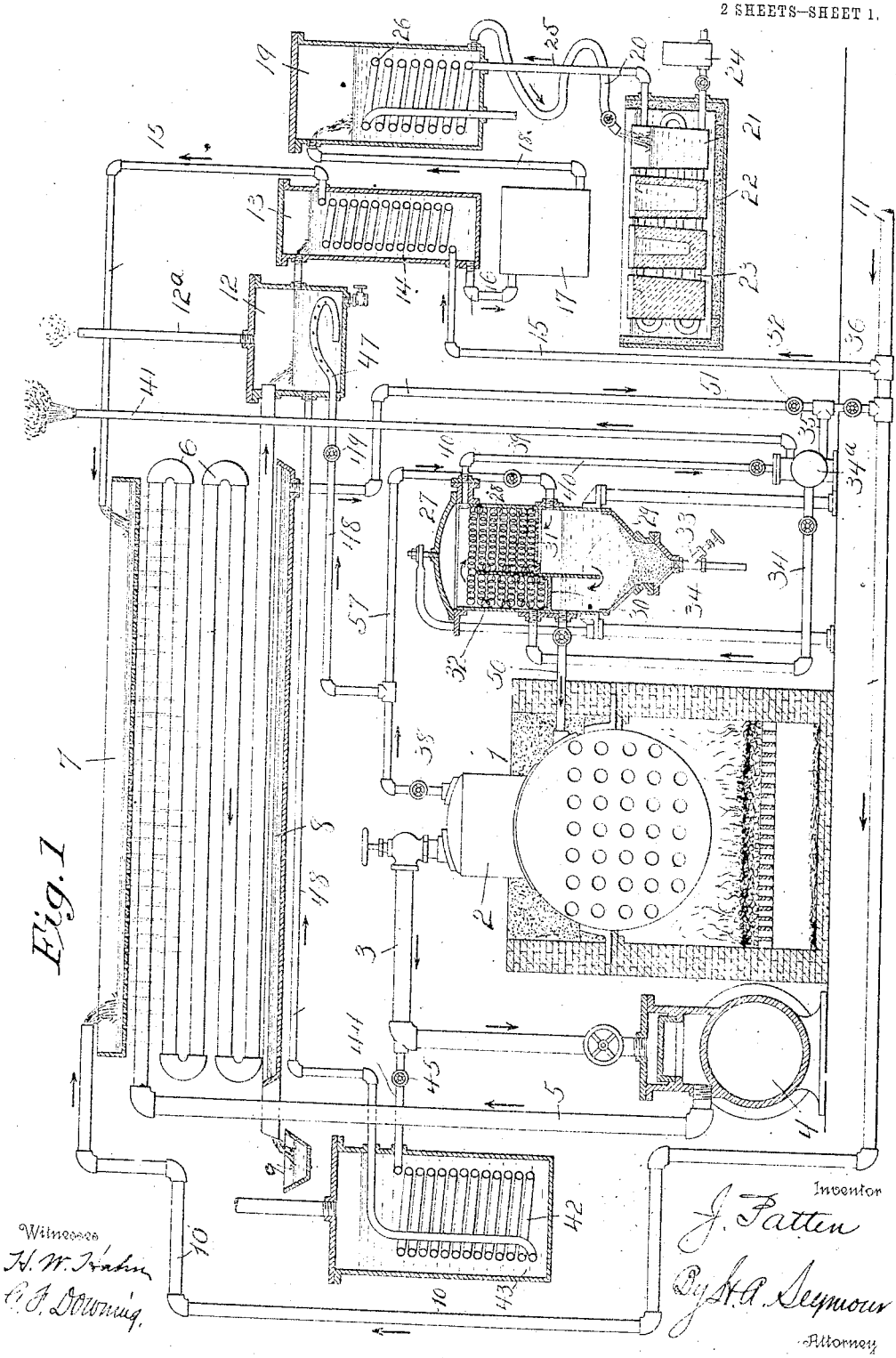

UNITED STATES PATENT OFFICE.

JOHN PATTEN, OF BALTIMORE, MARYLAND.

PURIFICATION OF WATER.

1,039,586.  Specification of Letters Patent.  Patented Sept. 24, 1912.

Application filed August 19, 1908. Serial No. 449,300.

*To all whom it may concern:*

Be it known that I, JOHN PATTEN, a resident of Baltimore, in the State of Maryland, have invented certain new and useful Improvements in Purification of Water; and I do hereby declare the following to be a full, clear, and exact description of the invention, such as will enable others skilled in the art to which it appertains to make and use the same.

This invention relates to the purification of water, and more particularly to the removing from the water of such foreign matter and gas as would cause corrosion of surface condensers and which would result in the contamination of the water.

Volatile acids and other compounds in water which cause corrosion, are liberated by heating the water with live steam and thus pass off with the steam through various pipes, coils and engines, and reach the condenser mixed with steam, where they produce corrosion.

I am aware that it is known that the application of steam under pressure to feed water, will cause the separation of gases and the precipitation of various chemical compounds, and that live steam water purifiers have been used for separating sediment and scale-forming compounds from the feed water before it enters the boiler.

The object of live-steam feed water purifiers has been to separate mineral compounds from the feed water and throw them out of the system, thereby providing the boiler with such water as will reduce the formation of scale in the boiler. The gases generated have been allowed to go to the condenser (such as employed in ice making apparatus) mixed with the steam and causing the corrosion of the metallic condensing surfaces and the contamination of the condensed water.

The object of my invention is to separate and throw out of the system, the volatile acids and other gases which are generated by heating ordinary surface water under pressure, by direct contact with live-steam from the boiler; thereby providing a surface condenser with pure steam which will not corrode the metallic condensing surfaces nor contaminate the condensed water with metallic compounds.

A further object is to provide improved means for the distillation of water for use in the manufacture of ice and for other purposes.

A further object is to provide means for supplying surface condensers of ice machinery with steam, from which volatile acids and other gases liable to corrode such condensers, have been eliminated, and to prevent the contamination of the water to be congealed with metallic compounds.

A further object is to provide means for conducting gases generated in a live-steam feed water purifier, from the latter; to utilize such gases mixed with steam to do work; and finally to discharge the same into the atmosphere.

I accomplish the purpose of my invention by passing the feed water through a live-steam purifier, and conducting the gases generated therein (mixed with steam) out of the system and preventing such gases from becoming mixed with the main steam supply which goes to the surface condenser, but to conduct the gases mixed with steam direct from the live-steam feed water heater to a feed water pump or other small engine or machine where the forces of the gases and steam can be utilized, said gases and steam being then discharged into the atmosphere. Thus the volatile acids and gases are separated from the water (before the water reaches the boiler); conducted out of the system, and not allowed again to mix with the steam. Consequently, the surface steam condensers are supplied with steam free from volatile acids and the corrosion of the condensers, as well as the contamination of the condensed water, will be avoided.

With the objects above stated in view, the invention consists in certain novel features hereinafter set forth and pointed out in the claims.

In the accompanying drawings, Figure 1 is a general view of an ice making plant illustrating an embodiment of my invention, and Fig. 2 is a view illustrating a modification.

1 represents a steam boiler furnace and 2 the steam dome. From the latter, a pipe 3 extends to an engine 4 and the exhaust from the latter passes through a pipe 5 to a condenser 6. This condenser is such as usually employed in ice machinery and comprises a coil, over which a trough 7 is disposed and provided with numerous perforations in its bottom through which water is discharged and permitted to flow over the condenser for the purpose of cooling the same and condensing the steam passing through it. After flowing over the coils of the condenser the cooling water becomes deposited in a pan or trough 8 from which it may be discharged into a chute 9. The cooling water is supplied to the trough 7 by means of a pipe 10 from a main source of water supply 11.

The water resulting from the condensation of steam in the condenser 6, is discharged into a tank 12 in which it is re-boiled as hereinafter explained, and from the tank 12 water is discharged into a cooler 13. The cooler 13 contains a coil 14, to one end of which water is conducted by a water pipe 15 from the main 11 and with the other end of said coil a pipe 15 communicates and conducts the water from said coil to the trough 7. The water is conducted from the cooler 13 by a pipe 16 to a filter 17 and from the latter the water flows through a pipe 18 by which it is discharged into a storage tank 19. A flexible pipe 20 communicates with the lower portion of the tank 19 and is intended to conduct water from said tank to any one of a series of pans or molds 21 located in a freezing tank 22. The freezing tank 22 contains an ammonia expansion coil 23 which is supplied with ammonia from a supply tank 24 communicating with one end of said expansion coil. The other end of the expansion coil is connected, by means of a pipe 25 with one end of a coil 26 in the tank 19 and the other end of this coil is intended to be connected with an ammonia compressor not shown.

A live-steam feed water purifier is shown at 27 and in the construction of apparatus disclosed in Fig. 1 of the drawing, this purifier comprises a cylinder 28 divided by a vertical partition 29 into two chambers, one having a tight bottom 30 and the other a perforated bottom 31. A chain 32 is located within the cylinder 28 and supported upon the bottoms of the respective chambers. The cover of the cylinder 28 is removable so that the chain may be withdrawn to remove artificial stone or scale therefrom. The vertical partition 29 extends below the bottoms of the chambers, above mentioned, and the portion of the cylinder below the lower end of the partition 29 constitutes a settling chamber with which a blow-off valve 33 is connected. A pipe 34 communicates with the chamber of the purifier having the tight bottom 30 and through this pipe, water is forced by means of a pump 34ª, said pump receiving the water through a pipe connection 35 from the main 11 and this pipe connection is provided with a valve 36. The water entering by the pipe 34 into the purifier will pass upwardly through the chain, then over the top of the vertical partition 29 and then downwardly through the chain and, after passing through the perforated bottom 31 will become deposited in the lower portion of the purifier. While the water is thus passing through the chain it will be subjected to the action of live-steam passing in the reverse direction through said chain, said live-steam being conducted to the purifier from the steam dome 2 of the boiler, by means of a pipe 57 which communicates with the purifier a short distance below the perforated bottom 31 of one of the chambers thereof. The pipe 57 is provided near the steam dome with a valve 38 and in proximity to the purifier, with a valve 39.

The action of the live-steam on the water passing through the chain of the purifier will be to cause the deposition on the links of the chain of scale forming materials and it will also cause the setting free of carbonic acid gas and volatile acids or gases which will be permitted to escape from the upper portion of the purifier through a pipe 40 and these gases will be conducted away in such manner as to prevent them from reaching the condensers. The gases and steam escaping from the purifier may be conducted by the pipe 40 to the pump 34ª and utilized for the operation of the latter. After performing this service the said gases and steam will be conducted from the pump 34ª by a pipe 41 and the latter will discharge them into the atmosphere.

A steam condensing coil 42 may be employed and is located in a tank or retort 43. One end of the condensing coil 42 is connected by a pipe 44 having a valve 45 with the pipe 3 from the steam dome 2. The other end of the condensing coil 42 is connected by a pipe 46 with the tank or reboiler 12. This tank or re-boiler contains a perforated coil 47 to which live-steam is conducted by a pipe 48 having a valve 49, from the pipe 37 connected with the steam dome 2. A discharge pipe 12ª for vapors etc., communicates with tank 12.

The water in the lower portion of the purifier which has been deprived of the scale forming materials and the gases as before explained, is conducted by a valved pipe 50 to the boiler so that the steam generated from this water will not contain gases which would corrode the surfaces of the condensers 6 and 42.

A pipe 51 may be connected at its upper end with the pan or trough 8 and at its lower end to the pipe connection 35, and at a suitable point in said pipe 51, a valve 52 is located. With this arrangement the cooling water which flows over the condenser 6 and enters the pan or trough 8, can be made to flow to the pump 34ª and by the latter be forced to the purifier.

When the water has a considerable amount of organic matter in it, a purifier such as shown in Fig. 2, may be employed. In Fig. 2, a settling tank 53 is connected at one end with the boiler by means of a valved pipe 54 and this settling tank is provided with a series of staggered baffles 55. The tank 53 is also provided at its bottom with a series of valved discharge outlets 56. A tank or cylinder 57 is located above the end of the settling tank farthest removed from the connection of the pipe 54 with said settling tank and the tank or cylinder 57 communicates with the settling tank through the medium of a short pipe section 58. A series of superimposed troughs 59, diminishing in size from the bottom to the top of the series, is located within the tank or cylinder 57 so that water discharged into the upper trough of the series will overflow into the next lower trough and so on through the series of troughs until it reaches the bottom of the tank or cylinder and flows into the settling tank. The water which thus enters the tank or cylinder 57 is conducted thereto through a pipe 60 and is forced into the latter from the main 11 by means of pump 61.

A pipe 62 having a valve 63, conducts live-steam from the dome 2 of the boiler into the top of the settling tank 53 in proximity to one end thereof. This steam passes over the surface of the water in the settling tank and is then conducted by a pipe 64 into the lower portion of the tank or cylinder 57. In passing through this tank, the live steam makes contact with the water flowing downwardly through said tank or cylinder and causes the gases (such as carbonic gas and volatile acids) to be separated from the water and escape with the steam through pipes 65—66 and to be conducted by the latter to the pump 61 where they are utilized for the operation of said pump. The pipe 66 may be provided with valves 67 and 68. The steam and gases will be exhausted from the pump 61 through a pipe 69 by which said steam and gases will be discharged to the atmosphere. The pipe 69 may be provided with a valve 70, near its discharge outlet.

The steam dome 2 is connected by means of pipe 3 with the engine 4 as in the construction shown in Fig. 1 and the pipe 5, from this engine, may conduct the exhaust steam to a condenser, as before explained. As shown in Fig. 2, the pipe 5 may be connected by means of a pipe 71 with the pipe 69 and said pipe 71 provided with a valve 72. A pipe 73 may be connected with the pipe 3 at one end and at its other end the said pipe 73 may communicate with the pipe 65 and is provided with valve 74.

Natural waters (such as river and well water) are charged with carbonic acid and hold considerable mineral matter in solution in the form of bi-carbonate which are soluble in water, but which are converted into insoluble mono-carbonates when the water is boiled, and the free carbonic acid is vaporized and passes off with the steam. Surface waters also contain organic matter which, upon heating to boiling temperature is decomposed, breaking up into carbonic acid, ammonia, tannic acid and various other acids and compounds which are vaporized and pass off with the steam; while the mineral matter (carbonate of lime, iron, magnesia etc.,) which are rendered insoluble by the escape of the volatile acids are precipitated and form scale. The accumulation of such scale in the boiler has been reduced by means of live-steam feed water purifiers as heretofore constructed, but the gases evolved in such purifiers have been permitted to pass with steam generated in the boiler, to condensers with the result of corroding the latter and contaminating the condensed steam. With my improvements, whereby such gases as above referred to, are removed from the water before it enters the boiler, the corroding and contaminating influences of such gases is avoided.

Having fully described my invention what I claim as new and desire to secure by Letters-Patent, is,—

1. The combination of a closed chamber, means for discharging water thereinto, means associated with said closed chamber for subjecting water flowing through the same, to the action of live steam for removing corroding gases from the water, pipes connected with said closed chamber for discharging said gases mixed with steam to the atmosphere, and means in the circuit of said pipes for utilizing said gases and steam to do work.

2. The combination of a closed container, a pump, a pipe connecting said pump with the closed container for forcing water to the latter, means associated with the closed container for conveying live steam through the water in the same, a pipe communicating with the upper portion of the closed container to receive mixed steam and gases, said pipe being connected with the motor portion of the pump, and a pipe connected with the exhaust of said motor portion of the pump and open to the atmosphere.

In testimony whereof, I have signed this specification in the presence of two subscribing witnesses.

JOHN PATTEN.

Witnesses:
MARY M. MAGRAW,
LEWIS N. HOPKINS, Jr.